(12) United States Patent
Hennum et al.

(10) Patent No.: US 8,756,231 B2
(45) Date of Patent: Jun. 17, 2014

(54) SEARCH USING PROXIMITY FOR CLUSTERING INFORMATION

(75) Inventors: Erik F. Hennum, San Francisco, CA (US); Marie L. Setnes, Rochester, MN (US); John S. Warren, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/695,732

(22) Filed: Jan. 28, 2010

(65) Prior Publication Data

US 2011/0184932 A1    Jul. 28, 2011

(51) Int. Cl.
*G06F 17/30* (2006.01)

(52) U.S. Cl.
USPC ........... 707/737; 707/711; 707/741; 707/748; 707/758; 707/754

(58) Field of Classification Search
CPC ................................. G06F 17/30; G06F 17/00
See application file for complete search history.

(56) References Cited

U.S. PATENT DOCUMENTS

| | | | |
|---|---|---|---|
| 5,542,090 A | | 7/1996 | Henderson et al. |
| 6,363,379 B1 | | 3/2002 | Jacobson et al. |
| 7,617,176 B2 * | 11/2009 | Zeng et al. ............ | 1/1 |
| 8,392,415 B2 * | 3/2013 | Wan ............. | 707/737 |
| 2005/0065959 A1 * | 3/2005 | Smith et al. ............ | 707/102 |
| 2006/0015497 A1 * | 1/2006 | Keating et al. ............ | 707/6 |
| 2006/0020597 A1 * | 1/2006 | Keating et al. ............ | 707/6 |
| 2007/0136275 A1 * | 6/2007 | Wan ............. | 707/5 |
| 2008/0148147 A1 * | 6/2008 | Poston et al. ............ | 715/273 |
| 2008/0222145 A1 | 9/2008 | Liu et al. | |
| 2009/0113350 A1 * | 4/2009 | Hibino et al. ............ | 715/853 |
| 2009/0167763 A1 * | 7/2009 | Waechter et al. ............ | 345/426 |
| 2009/0225081 A1 * | 9/2009 | Keller et al. ............ | 345/426 |
| 2010/0174732 A1 * | 7/2010 | Levy et al. ............ | 707/768 |
| 2010/0174977 A1 * | 7/2010 | Mansfield et al. ............ | 715/234 |
| 2010/0191748 A1 * | 7/2010 | Martin et al. ............ | 707/750 |

OTHER PUBLICATIONS

Tan, Pang-Ning et al., "Introduction to Data Mining: Chapter 8: Cluster Analysis: Basic Concepts and Algorithm," Addison-Wesley, 2006, pp. 487-568.*

Ferragina, P. and Gulli, A., "A personalized search engine based on Web-snippet hierarchical clustering," May 29, 2007, Software—Practice and Experience, vol. 28, issue 2, Wiley Online Library, pp. 189-225.*

(Continued)

*Primary Examiner* — Farhan Syed
(74) *Attorney, Agent, or Firm* — Kenneth L. Sherman, Esq.; Michael Zarrabian, Esq.; Sherman & Zarrabian LLP

(57) ABSTRACT

The invention provides a method and system for hierarchical search retrieval. The method includes performing a text search on a hierarchy data structure of information. Forming a limited size hierarchy data structure using the search results. Assigning a location number for each search result in the hierarchy data structure. Sorting the hierarchy data structure. Clustering the sorted hierarchy data structure by categorizing the search results in the hierarchy data structure into groups that are related based on proximity. Limiting a hierarchical depth for each group in the clustered hierarchy data structure based on a configurable depth value to reduce hierarchical results for presentation. Providing the clustered hierarchical data structure as a list of search results as output.

19 Claims, 12 Drawing Sheets

(56) References Cited

OTHER PUBLICATIONS

Turtken, Ozgur and Sharda, Ramesh, "Clustering-Based Visual Interfaces for Presentation of Web Search Results: An Emperical Investigation," 2005, Springer Science, Information Systems Fronteers vol. 7, Issue 3, pp. 273-297 (25 pages).*

Chavez, Edgar, et al., "Fixed Queries Array: A Fast and Economical Data Structure for Proximity Searching," 2001, Kluwer Academic Publishers, Multimedia Tools and Applications, vol. 14, pp. 113-135 (23 pages).*

Ferragina, P., et al, "A personalized search engine based on Web-snippet hierarchical clustering," May 29, 2007, Wiley Interscience, Software—Practice and Experience, vol. 38, pp. 187-225 (37 pages).*

Masulli, Francesco, et al., "A New Approach to Hierarchical Clustering for the Analysis of Genomic Data," Jul. 31-Aug. 4, 2005, IEEE, Proceedings of the International Joint Conference on Neural Networks, pp. 155-160 (6 pages).*

* cited by examiner

Search: [          ] —520

Cluster: |——△——|———| —530
         Shallow        Deep

Table of contents

510 {
- 📑 Rhubarb facts
  - 📄 Rhubarb is a vegetable
  - 📄 Don't eat the leaves
  - 📄 Use nonreactive pie plates
- 📑 Planting rhubarb
  - 📄 Fertilizing
  - 📄 Weeding
  - 📄 Harvesting
- 📑 Rhubarb recipes
  - 📑 Crumbles
    - 📄 Apple-Berry-Rhubarb crumble
    - 📄 Pineapple-Rhubarb crumble
  - 📑 Pies
    - 📑 With berry
      - 📄 Blackberry-Rhubarb pie
      - 📄 Raspberry-Rhubarb pie
      - 📄 Strawberry-Rhubarb pie
    - 📄 Apple-Rhubarb pie
    - 📄 Cream cheese Rhubarb pie
    - 📄 Zucchini-Rhubarb pie

FIG. 5

SEARCH USING PROXIMITY FOR CLUSTERING INFORMATION

BACKGROUND OF THE INVENTION

1. Field of the Invention

The present invention relates generally to search retrieval, and in particular to using proximity for clustering returned information.

2. Background Information

Current structured searching for content, such as an Internet search, is based on input text that is typically in the form of one or more words. The result of a typical search is usually a weighted index of text results, which can be based on many factors. Some of these factors include: weight based on a fee, weight based on probability of correctness, weight based on location, etc. A problem with text searching may arise when the results consists of a very large list. This can result in spending much time navigating through search results that are not relevant to what the searcher intended to find.

BRIEF SUMMARY OF THE INVENTION

One embodiment of the invention provides a method and system for query searching using proximity for clustering returned information. One implementation comprises a search retrieval system including a search engine module configured to determine search results based an inputted search term. A clustering module is configured to form a limited size hierarchy data structure using the search results. The clustering module is further configured to assign a number of hierarchy locations for each search result in the hierarchy data structure based on a predefined hierarchy location number limit. The search results in the hierarchy data structure are clustered by assigning the search results to particular groups that are related based on proximity. A hierarchical depth of the clustered hierarchy data structure is limited to reduce hierarchical results for presentation. The clustered hierarchical data structure is output as a list of search results.

In another embodiment of the invention, a system comprises a server device that is coupled to a search engine module configured to determine search results based an inputted search term. A clustering module is configured to: form a limited size hierarchy data structure using the search results. A hierarchy location number for each search result is assigned in the hierarchy data structure based on a predefined hierarchy location number limit. The search results in the hierarchy data structure are clustered by categorizing the search results in the hierarchy data structure into particular groups that are related based on proximity. A hierarchical depth for each group is limited to reduce hierarchical results for presentation. The clustered hierarchical data structure is output as a list of search results.

Still another embodiment of the invention provides a method of performing a text search on a hierarchy data structure of information. Forming a limited size hierarchy data structure using the search results. Assigning a location number for each search result in the hierarchy data structure. Sorting the hierarchy data structure. Clustering the sorted hierarchy data structure by categorizing the search results in the hierarchy data structure into groups that are related based on proximity. Limiting a hierarchical depth for each group to reduce hierarchical results for presentation. Providing the clustered hierarchical data structure as a list of search results as output.

Yet another embodiment of the invention provides a computer program product for proximity search result clustering comprising a computer usable medium including a computer readable program, wherein the computer readable program when executed on a computer causes the computer to perform a text search to obtain search results based on an inputted search term. Assign a location number for each search result in the hierarchy data structure. Sort the hierarchy data structure. Cluster the sorted hierarchy data structure of search results by categorizing the search results in the hierarchy data structure into groups that are related based on proximity. Limit a hierarchical depth for each group in the clustered hierarchy data structure based on a predetermined depth value to reduce hierarchical results for presentation. Provide the clustered hierarchical data structure as a list of search results as output.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 4 illustrates an example of a sorted hierarchy result location value list according to one embodiment of the invention;

FIG. 5 illustrates another example user interface showing a hierarchical navigation page according to one embodiment of the invention;

DETAILED DESCRIPTION

Figure 1:
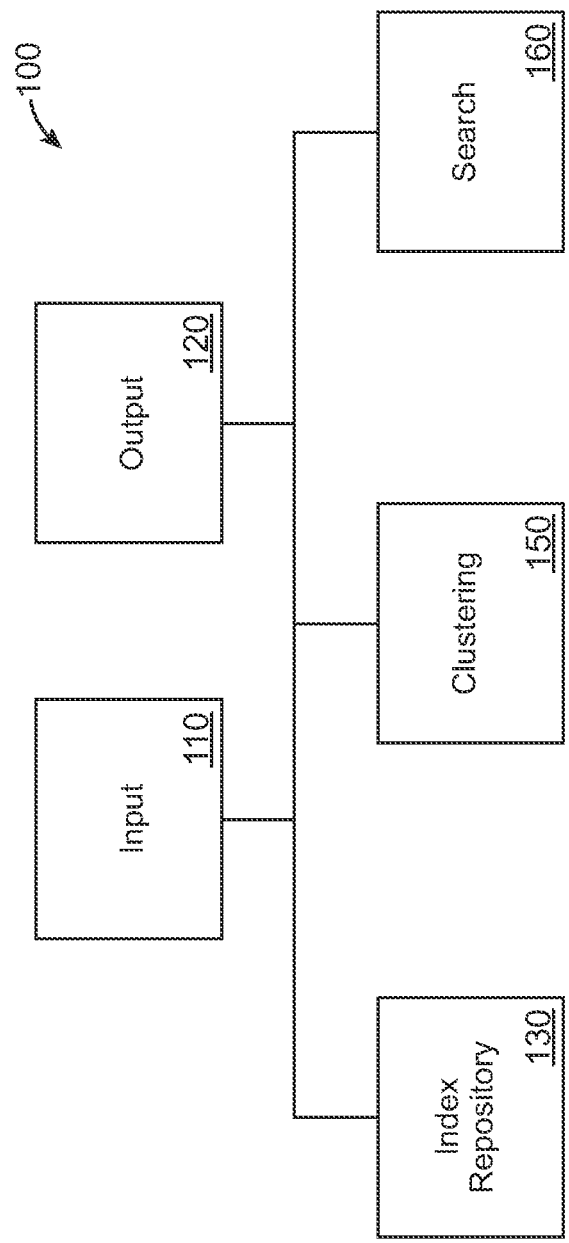
FIG. 1 illustrates a hierarchical search retrieval device according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for using proximity for clustering returned information for a search, as well as operation and/or component parts thereof. While the following description will be described in terms of search retrieval systems and processes for clarity and placing the invention in context, it should be kept in mind that the teachings herein may have broad application to all types of systems, devices and applications.

Embodiments of the invention cluster or group search results or an authored hierarchy of information (e.g., documents, articles, links, etc.) that are closely related based on their proximity or location in a hierarchy of classified subject matter, topics, etc. With these embodiments of the invention, navigation through a hierarchy and search are united. Additionally, the clustering or grouping of search results or authored hierarchy of information is customizable, where a user may modify the size of the group or cluster based on depth level within the search results or authored hierarchy of information. This saves time by limiting search results or authored hierarchy of information to a desired window size of information, and may reduce processing time as well to reduce wait time, increase a processing system bandwidth, etc. The embodiments also consolidates results, improves results ranking, and improves finding the information a user may be searching or looking for through continued consolidation of results within the hierarchy.

One embodiment of the invention provides query searching using proximity for clustering returned search result information. One implementation comprises a search retrieval system including a search engine module configured to determine search results based on an inputted search term. A clustering module is configured to form a limited size hierarchy data structure using the search results. The clustering module is further configured to assign a number of hierarchy locations for each search result in the hierarchy data structure. The clustering module is still further configured to cluster search results in the hierarchy data structure by assigning the search results to particular groups that are related based on proximity. A hierarchical depth of the clustered hierarchy data structure is limited to reduce hierarchical results for presentation. The clustering module is further configured to output the clustered hierarchical data structure as a list of search results.

FIG. 1 illustrates an implementation of said search retrieval system comprising a hierarchical search retrieval system 100, according to one embodiment of the invention. The search retrieval system 100 includes an input module/device 110, an output module/device 120, an index repository 130, a clustering module/device 150 and a search module/device 160. In one or more embodiments of the invention the index repository 130 may be distributed in multiple separate or combined repositories, etc. The search retrieval system 100 provides search processing using proximity for clustering returned information. In one embodiment of the invention, hierarchical proximity may be implemented for clustering returned information, where the hierarchical proximity, for example, may be based on location relationship in a hierarchy. In other embodiments of the invention, navigational proximity may be implemented for clustering returned information, where the navigational proximity, for example, may be based on moving between information in a proximate space of, for example, a results list, authored hierarchy, etc. In some embodiments of the invention, search results that are within a user-defined depth/level of a hierarchy are clustered, and the clusters are ranked with the remaining search results, which provides result consolidation, and improved ranking and "findability" through continued drill-down focusing within the hierarchy.

In one example, the index repository 130 is implemented in one or more of the following types of machine-readable memories: semiconductor firmware memory, programmable memory, non-volatile memory, read only memory, electrically programmable memory, random access memory, flash memory, magnetic disk memory, and/or optical disk memory, memory device arrays, virtual memory space using a memory device, etc. Either additionally or alternatively, the index repository 130 may comprise other and/or later-developed types of computer-readable memory.

In one embodiment of the invention, the input module 110 is configured for receiving one or more text search terms from a user to search portions of index documents in the index repository 130. The output module 120 is configured for receiving a hierarchical result list at the conclusion of a search query execution performed by the clustering module 150 and the search module 160, described further below.

In one or more embodiments of the invention, a search text may be entered into the input module 110 by using devices, such as a keyboard, a selection via a pointing device (e.g., a mouse), voice commands converted into text, resistive digitizers (i.e., touch-screens), etc. In some embodiments of the invention, the results of a search processed by the search module 160 are received via the output module 120 and may be displayed on any type of display screen (e.g., cell phone, monitor, personal digital assistant (PDA), projected display, etc.).

In one implementation, each element in the index repository 130 is denoted as an index document. Each index document in the index repository 130 may be a search result returned by the search module 160 based on a user query. Each such index document comprises stored information/metadata, such as text or encoded strings representing, e.g., a result title, description, a list of text strings associated with the title and description, multiple classifications, etc.

In one example, the index documents are initially provided by a publisher, such as a system administrator, a company website, organization, university, individual, etc. In another example, the index documents may be learned and added by the search retrieval system 100 over time based on search queries and positive/negative feedback as to the accuracy of the returned results.

In one embodiment, the clustering module 150 is configured to add a first search result from a search result list returned by the search module 160 to a new cluster (of related information), such as topics, classifications, documents, links, etc., and then examine the rest of the search results to determine if they belong in the same cluster (or group). In one example, the clustering module groups the next search result from the search result list that is not part of the first cluster, and adds it to a second new cluster, and the remaining non-clustered search results from the search results list are analyzed by the clustering module 150 to determine if they belong in the second cluster. This process continues until all of the results in the search results list have been assigned to a cluster.

In one embodiment of the invention, the clustering module 150 may limit clustering to the top n results to reduce processing cluster results, where n is a predefined number that can be based on system capability and processing bandwidth.

In that case, remaining results beyond n are still provided in a final search results list to a user, but no clustering is performed for the results outside the preset number n. In one example, if the number of returned results is less than n, then all search results from the search results list are clustered.

Figure 2:
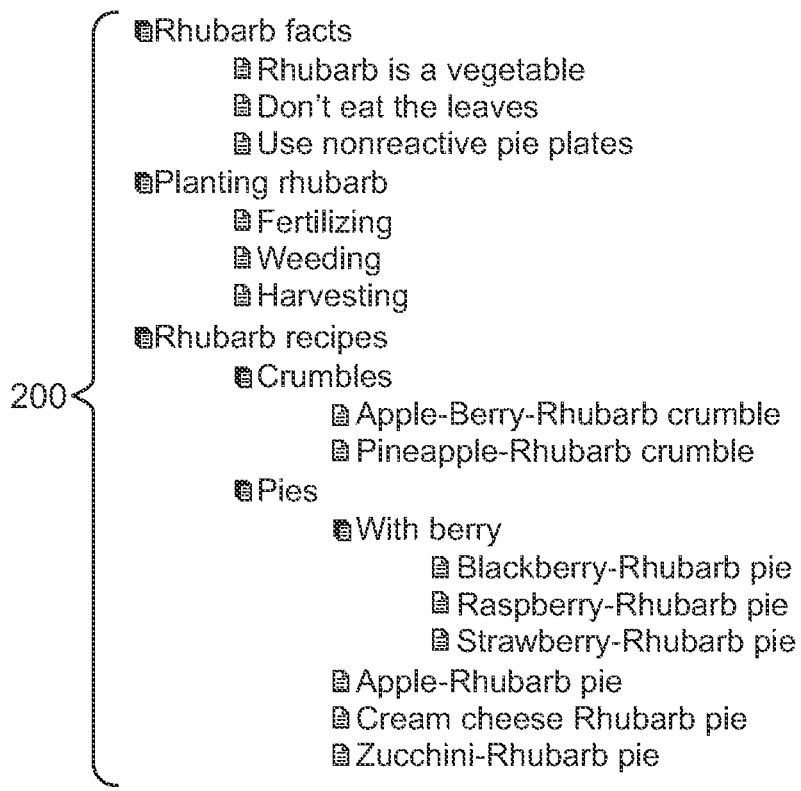
FIG. 2 illustrates an example of a hierarchy data structure listing of information used for navigating to find desired results by a user according to one embodiment of the invention.

FIG. 2 illustrates an example of a hierarchy 200 of information based on the concept of "Rhubarb." In this example hierarchy, a user may have navigated through various information to arrive at the point of navigation where the hierarchy 200 shows information in a hierarchy for the concept of "Rhubarb." In one embodiment of the invention, the information in the hierarchy 200 may be supplied via a publisher, multiple publishers, populated by users, learned though searching, etc.

Figure 3:
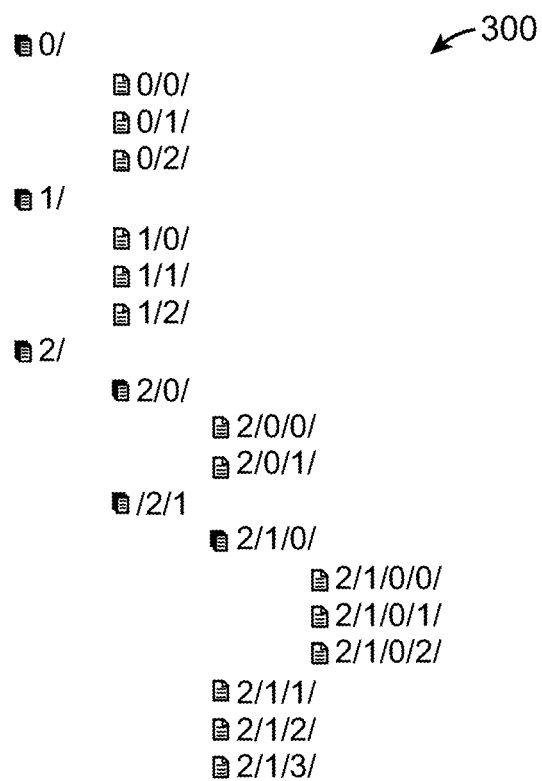
FIG. 3 illustrates an example of all items in a hierarchy data structure assigned with a location value according to one embodiment of the invention.

In one embodiment of the invention, a location number may be assigned for each of the top m search results. The assigned location numbers may be based on the relative location of each of the search results to one another. In one implementation the top location may be assigned the number "0" and each location from the top is incremented by "1." In one embodiment of the invention, the clustering module 150 forms a "HIERARCHY_LOCATIONS" sortable data structure, such as a one or more dimensional hierarchy locations array/list, a tree structure, a queue, a database, etc. In one embodiment of the invention, the data structure "HIERARCHY_LOCATIONS" may have a size m and the clustering module 150 stores the assigned location numbers in the HIERARCHY_LOCATIONS data structure. FIG. 3 illustrates an example where every item in the hierarchy 200 may be assigned a location. In this example, the location list 300 is based on the location assignments of each item in the HIERARCHY data structure using the slash step symbol "/" to denote the sequence in the authored hierarchy location.

For example purposes, below is a family tree showing a basic hierarchy with name, family relation and assigned locations in the hierarchy using the "/" step symbol. In this example, the closer the "distance" in the hierarchy, the more the tree items will be relevant to each other. In some embodiments of the invention, the distance is defined to mean how close a node is to a common ancestor, or, if one node is another node's ancestor, the distance between the descendent and ancestor. Siblings have a distance of 0. In the example tree below, Tina and Thomas have a distance of 0 because they are siblings. The common direct ancestor is Ted. Tina and Bruce have a distance of 3. The common ancestor is Adam. Tina is two steps away from Adam and Bruce is one step away from Adam. In one embodiment of the invention, the oldest member of the tree is assigned a hierarchy location /0. The first born child of the oldest has hierarchy location /0/0. The second born child of the oldest has hierarchy location /0/1.

ADAM (Grandfather, a root node, hierarchy location /0)
    TED (father, hierarchy location /0/0)
        TINA (daughter, hierarchy location /0/0/0)
        THOMAS (son, hierarchy location /0/0/1)
        THERESA (daughter, hierarchy location /0/0/2)
    CATHY (aunt, hierarchy location /0/1)
    BRUCE (uncle, hierarchy location /0/2)

In one embodiment of the invention, the number of clustered search results may be equal to size s using the search results based on a user query, where s may equal the lesser of the number n, a predefined number indicating the maximum number of results that will be clustered, and the number of results for the search query processed by the search module 160. For example, for n set to 100, which means that only the first 100 results will be clustered, if only 25 results total were returned for the search then s=25=min{25, 100}.

In one implementation, the first m results 400 are stored in a "HIERARCHY" sortable data structure, such as a one or more dimensional hierarchy array/list, a tree structure, a queue, a database, etc. In one embodiment of the invention, the clustering module 150 forms an "INITIAL_RANK" data structure sortable data structure, such as a one or more dimensional hierarchy array/list, a tree structure, a queue, a database, etc. In one embodiment of the invention, the clustering module 150 stores an initial rank for each of the first m search results in the search results list in the INITIAL_RANK data structure. In one or more embodiments of the invention, the initial rank data structure is used to keep track of how the initial text search results were returned. Since the HIERARCHY_LOCATIONS data structure will be rearranged into clusters, the value of the initial rank data structure assists in determining where the cluster should appear in the results list. In one embodiment of the invention, the clustering module 150 forms a "CLUSTERED" sortable data structure, such as a one or more dimensional hierarchy array/list, a Boolean array/list. tree structure, a queue, a database, etc. In one embodiment of the invention the CLUSTERED data structure is a Boolean list. In one embodiment of the invention the CLUSTERED data structure is formed by the clustering module 150 of size m to indicate whether or not each search result in a search result list 200 is part of a cluster yet or not. In one example, all elements of the CLUSTERED data structure are initialized to a value, such as a value to indicate "false," and the elements are set to a value to indicate "true" once the elements become part of a cluster. In one or more embodiments of the invention, other status identifiers may be used for the CLUSTERED data structure.

Figure 4:
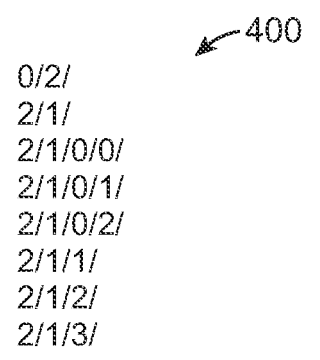

In one embodiment of the invention, the clustering module 150 sorts the HIERARCHY_LOCATION data list. FIG. 4 illustrates an example of a sorted list 400 obtained from sorting the HIERARCHY_LOCATION list of search results returned from a search of the hierarchy given in FIG. 2 using the term 'pie.'

In one embodiment of the invention, the HIERARCHY_LOCATIONS data structure is sorted based on the assigned location numbers. In this embodiment of the invention, the INITIAL_RANK data structure is also sorted in the same manner as the HIERARCHY_LOCATIONS data structure since they are associated data structure s.

In one implementation, while at least one element in the CLUSTERED data structure is "false," j (where j is used as an iteration index to the data structure and is a positive integer) is set equal to the index of the next item in CLUSTERED that has a status identifier set as "false." A new cluster list may be started by adding the result with index INITIAL_RANK[j] for the initial rank data structure to form clusters from the search result list. The element indicated by CLUSTERED[j] in the clustered data structure may be set to "true," and the current cluster being formed is set equal to the element j in the HIERARCHY_LOCATIONS[j] data structure. The clustering module 150 then sets the index j equal to the index of the next item in the CLUSTERED data structure that is "false," or m if no such item exists. In this case, the sorted hierarchy list 400 of search results are clustered by categorizing the search results list into clusters/groups that are related based on matching semantics.

In one embodiment of the invention, while j<m, the clustering module 150 calculates the number of steps between clusters using the HIERARCHY_LOCATIONS[j] data structure. In one implementation, a step symbol is used to denote the steps or positions between positions in the hierarchy, such as a slash "/" as shown in FIGS. 3 and 4. Other step symbols may be employed without altering the scope of the embodiments of the invention.

In one embodiment of the invention, the clustering module 150 removes the common starting paths from the assigned location identifier of each search result and determines the number of step symbols (e.g., "/" or slashes) in the remaining portions of the search result assigned location data structure HIERARCHY_LOCATIONS to obtain the number of steps. In one implementation, a determination may be made as to the number of steps between the example assigned locations "2/1/" and "2/2/1/" that may exist in a hierarchy location list. In this example, the common starting path of "2/" is removed by the clustering module 150 from each location so that "1/" and "2/1/" remain. Then, the total number of slashes "/" is counted by the clustering module 150 (e.g., 3 in this example) to determine the number of steps between the assigned locations "2/1/" and "2/2/1/."

As an alternative, in one embodiment of the invention the clustering module 150 may automatically assign a maximum integer allowed by the search retrieval system 100 as the number of steps between assigned locations for the search results that are not part of the same root node. In this case, setting the number of steps to the maximum integer ensures that search results belonging to different root nodes appear in separate clusters. In one example, in the Java programming language a concept or function exists known as INTEGER_MAX, which indicates the largest positive integer value supported by the system in use. In one implementation of Java, the int data type is a 32-bit signed two's complement integer. The int data type has a minimum value of −2,147,483,648 and a maximum value of 2,147,483,647 (inclusive). For integral values, this data type is generally the default choice unless there is a reason (like the above) to choose something else. This data type is large enough for typical numbers a program will use.

In one embodiment of the invention, if the number of steps falls within a user-defined threshold for a cluster depth, INITIAL_RANK[i] is used to add the search result to the current cluster list and the element indexed as CLUSTERED[j] is set equal to "true". In one example, j is incremented and set equal to the index of the next item in the CLUSTERED data structure that is set to "false," or incremented and set equal to m if no such item exists. In that case, the hierarchical depth is limited for each group based on a predetermined depth value to reduce hierarchical results for presentation.

In one example, the predetermined hierarchical depth is selected by a user. In other examples, the predetermined depth value may be selected based on heuristics, based on the number of results, or set to a value by an administrator, etc. In one example, the sorted and hierarchical limited search results are added to the presentation cluster list based on the predetermined depth value, and the clustered list is output to the output module 120 for presentation to a user.

It should be noted that in some embodiments of the invention, a search result may exist in multiple locations in the hierarchy. When this situation occurs, the following options are available according to some embodiments of the invention. The clustering module 150 adds such a search result to a best fit cluster list if it fits in multiple lists, where the best fit is defined as that requiring the smallest number of steps between multiple assigned locations in the HIERARCHY_LOCATIONS data structure. The clustering module 150 may allow the search result to be part of multiple clusters, but the search result may not be the root of a cluster. The clustering module 150 may place the search results with multiple hierarchy locations at the top of unclustered search results that may exist. The clustering module 150 may also only consider the first location in the search results list where a multiple entered search result is located and ignore the other locations in the second search result list. In some applications, a search result will not exist in a cluster. When this situation occurs, the clustering module 150 may place the search result at the top of the unclustered search results.

In one embodiment of the invention, the clustering module 150 performs ranking of clusters as follows. In one implementation the clustering module 150 generates a list of clustered search result lists. In the list of clustered search results list, an outer list and an inner list of search results may be formed. The search results of the outer list represent distinct clusters and the search results of the inner lists represent results in the same cluster. Some embodiments of the invention may assign the rank/score to a cluster for the purposes of ranking as follows. In one example, the clustering module 150 sums together the scores of the search results in a cluster. In another example, the clustering module 150 counts the number of search results in the cluster. In still another example, the clustering module 150 averages the scores of the search results in the cluster. In yet another example, the clustering module 150 uses the median of the scores of the search results in the cluster. In one embodiment of the invention, a score may be the value of the INITIAL_RANK element, where low value indicates that the search result was closer to the top of the search results. In one embodiment of the invention, the initial rank is obtained by linguistic analysis (i.e., a normal text search). In other embodiments, the initial rank may be based on other analysis and processing, such as heuristics, manual assignment, statistics, etc.

FIG. 5 illustrates an example user interface showing a hierarchy. The table of contents 510 in user interface 500 contains links to index documents for a particular topic or classification that are stored in index repository 130. In this example, the hierarchy depicts topics related to "Rhubarb." The index documents are populated by authors or publishers. As further illustrated by FIG. 5, the search bar 520 may be used for entering search terms to search the table of contents 510 to narrow down search results by a user. The cluster selector 530 may be used to select a hierarchy depth to display clustered results of a search using the search bar 520. In this example, the cluster selector 530 is set to a depth of one level to the right of shallow, which indicates a predetermined cluster depth such as 1, 2, 3, etc., depth levels of clustering will be used when a search is performed.

In one embodiment of the invention, different layouts may be used for a user interface for receiving input search information and outputting the results from searches. For example, FIG. 5 illustrates an example user interface 500 (e.g., a browser page) showing a hierarchy which is essentially a table of contents 510 that is linked to searchable index documents stored in the index repository 130 for various topics or classifications. In one embodiment of the invention, the user interface 500 may comprise a graphical user interface (GUI) that can execute in one or more of the input module 110, the output module 120 and the search module 160.

Figure 6:
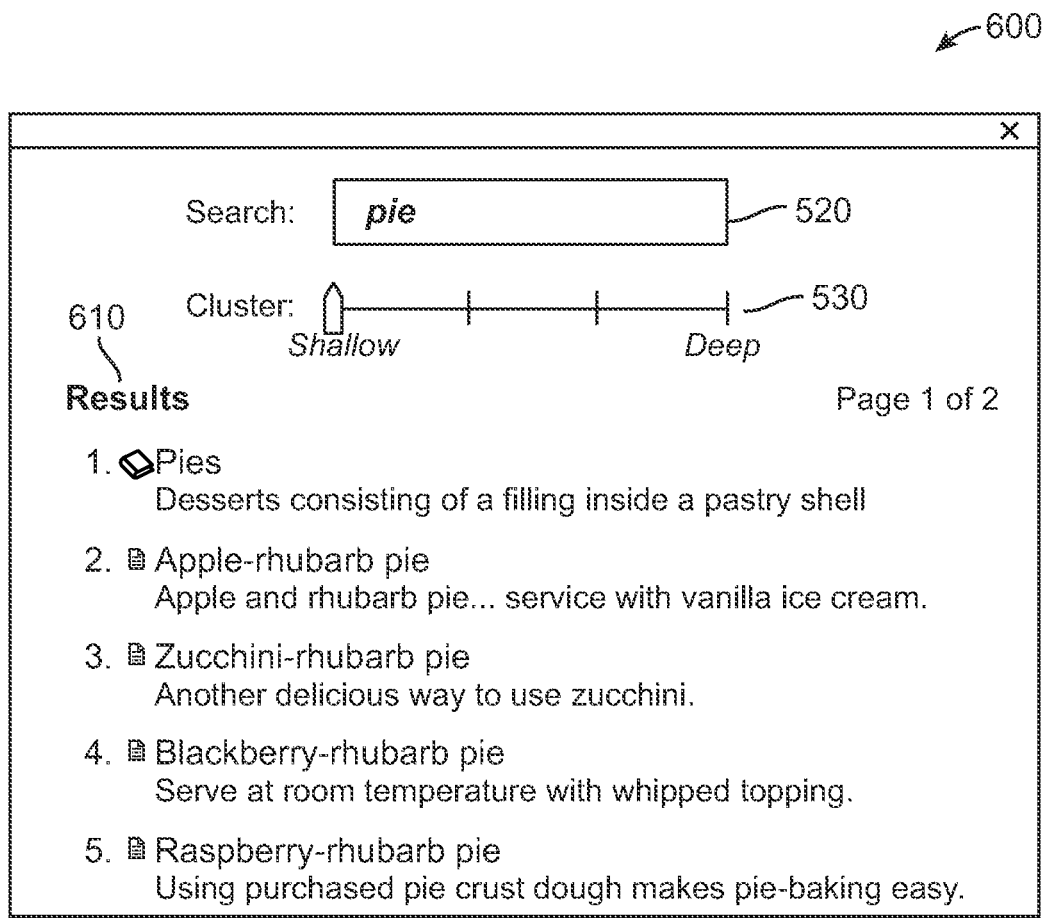
FIG. 6 illustrates yet another example user interface showing a hierarchical result page according to one embodiment of the invention.

FIG. 6 illustrates an example user interface 600 showing a hierarchical results page according to one embodiment of the invention. As illustrated, a search term 'pie' has been input in the search bar 520 of the user interface 600 by a user. The search results 610 of a search for 'pie' using the example table of contents hierarchy 510 is shown where the cluster hierarchy depth selector 530 is selected as shallow for this example, where shallow may be predefined as 0, 1, 2, etc., depth levels of clustering. In this embodiment of the invention, once the search module 160 returns the search results, the clustering module 150 processes the search results as described above and outputs the search results 610.

Figure 7:
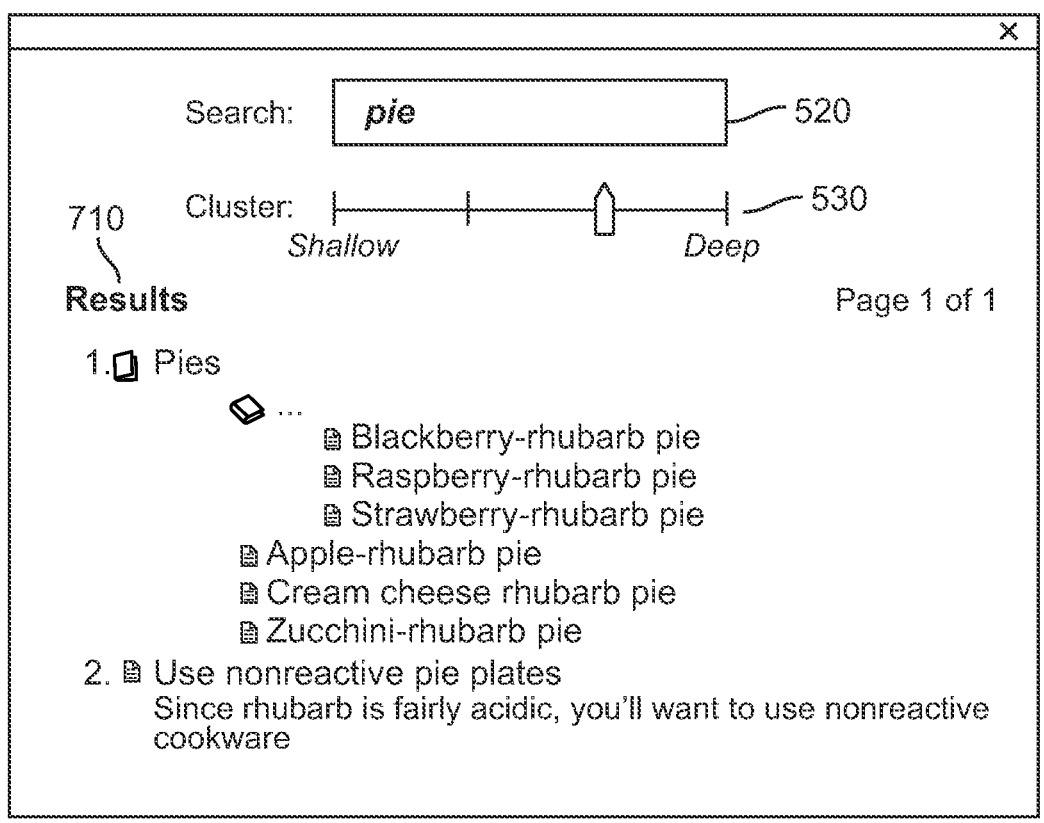
FIG. 7 illustrates another example of a user interface showing a hierarchical result page according to one embodiment of the invention.

FIG. 7 illustrates yet another example user interface 700 showing a hierarchical result page according to one embodiment of the invention. As illustrated, a search term 'pie' has been input to in the search bar 520 of the user interface 700 by a user. The search results 710 of the search for 'pie' using the example table of contents hierarchy 510 is shown where the cluster depth selector 530 is selected as two steps away from shallow towards deep for this example. In this embodiment of the invention, once the search module 160 returns the search results, the clustering module 150 processes the search results as described above and outputs the search results 710.

Figure 8:
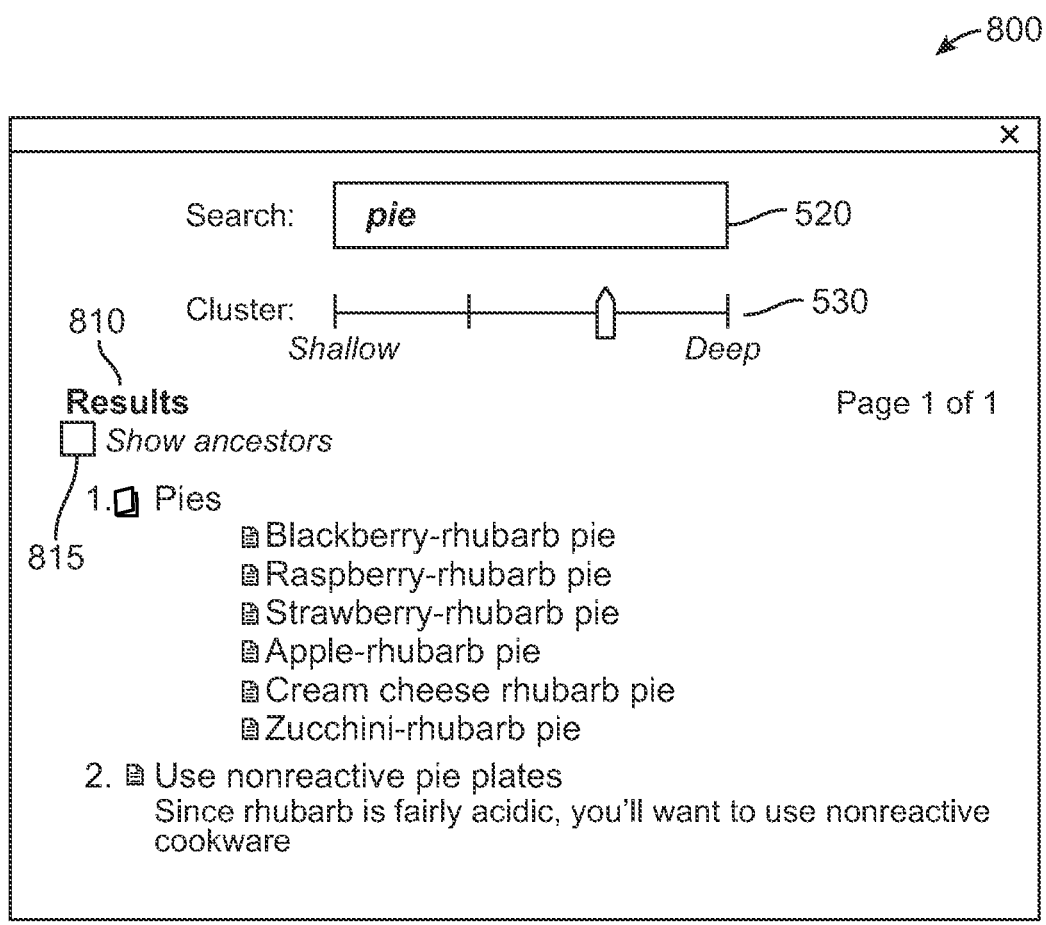
FIG. 8 illustrates still another example of a user interface showing a hierarchical result page according to one embodiment of the invention.

FIG. 8 illustrates another example user interface 800 showing a hierarchical result page according to one embodiment of the invention. As illustrated, a search term 'pie' has been input to in the search bar 520 of the user interface 800. The search results 810 of the search for 'pie' using the example table of contents hierarchy 510 is shown where the cluster hierarchy depth selector 530 is selected as two steps to the right from shallow towards deep for this example. In this embodiment of the invention, once the search module 160 returns the search results, the clustering module 150 processes the search results as described above and outputs the search results 810. In this embodiment of the invention, an ancestor selection box 815 may be used for showing higher hierarchy level related family members (i.e., ancestors) of search results links to index documents if desired. In this specific example, the ancestor selection box 815 is not selected. In one or more embodiments of the invention, any relevant results 810 may be displayed as siblings (i.e., index document search results in a same hierarchy level or depth) under the lowest common ancestor.

Figure 9:
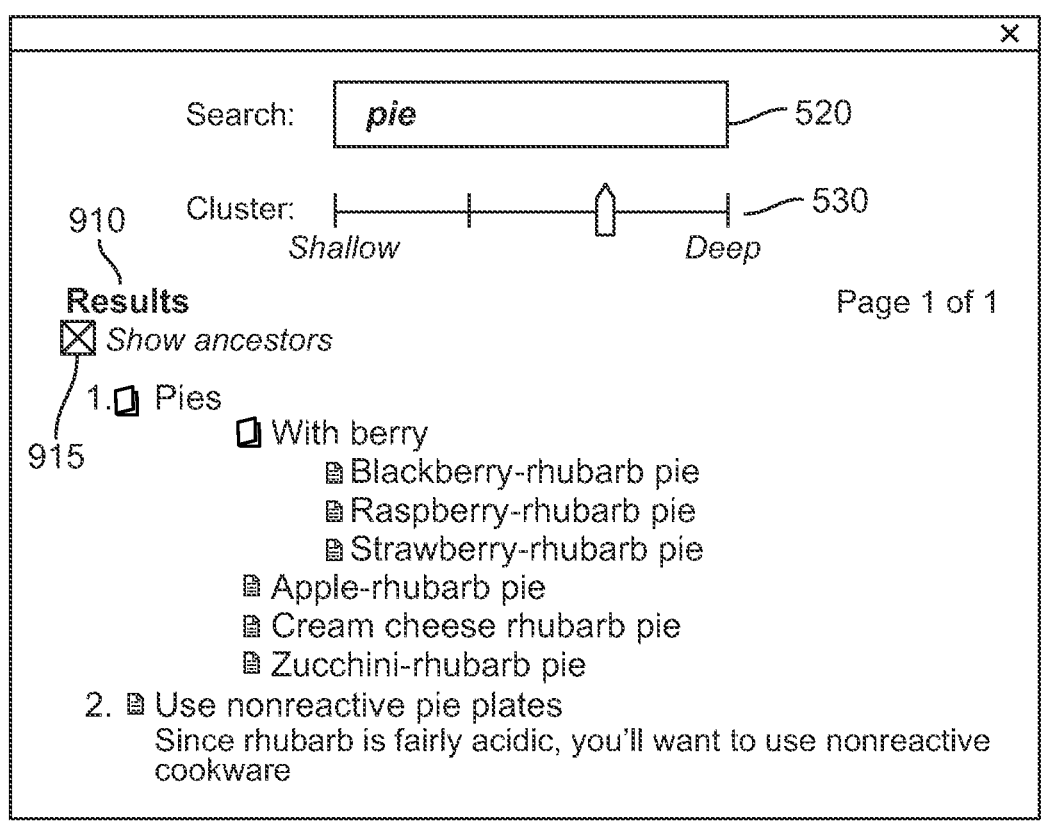
FIG. 9 illustrates still another example of a user interface showing a hierarchical result page according to one embodiment of the invention.

FIG. 9 illustrates another example user interface 900 showing a hierarchical result page according to one embodiment of the invention. As illustrated, a search term 'pie' has been input to in the search bar 520 of the user interface 900. The search results 910 of the search for 'pie' using the example table of contents hierarchy 510 is shown where the cluster hierarchy depth selector 530 is selected as two steps to the right from shallow towards deep for this example. In this embodiment of the invention, once the search module 160 returns the search results, the clustering module 150 processes the search results as described above and outputs the search results 910. In this specific example, the ancestor selection box 915 is selected and the ancestors are shown in the user interface 900. In this example, the ancestor shown is the index document link having the title "With berry."

Figure 10:
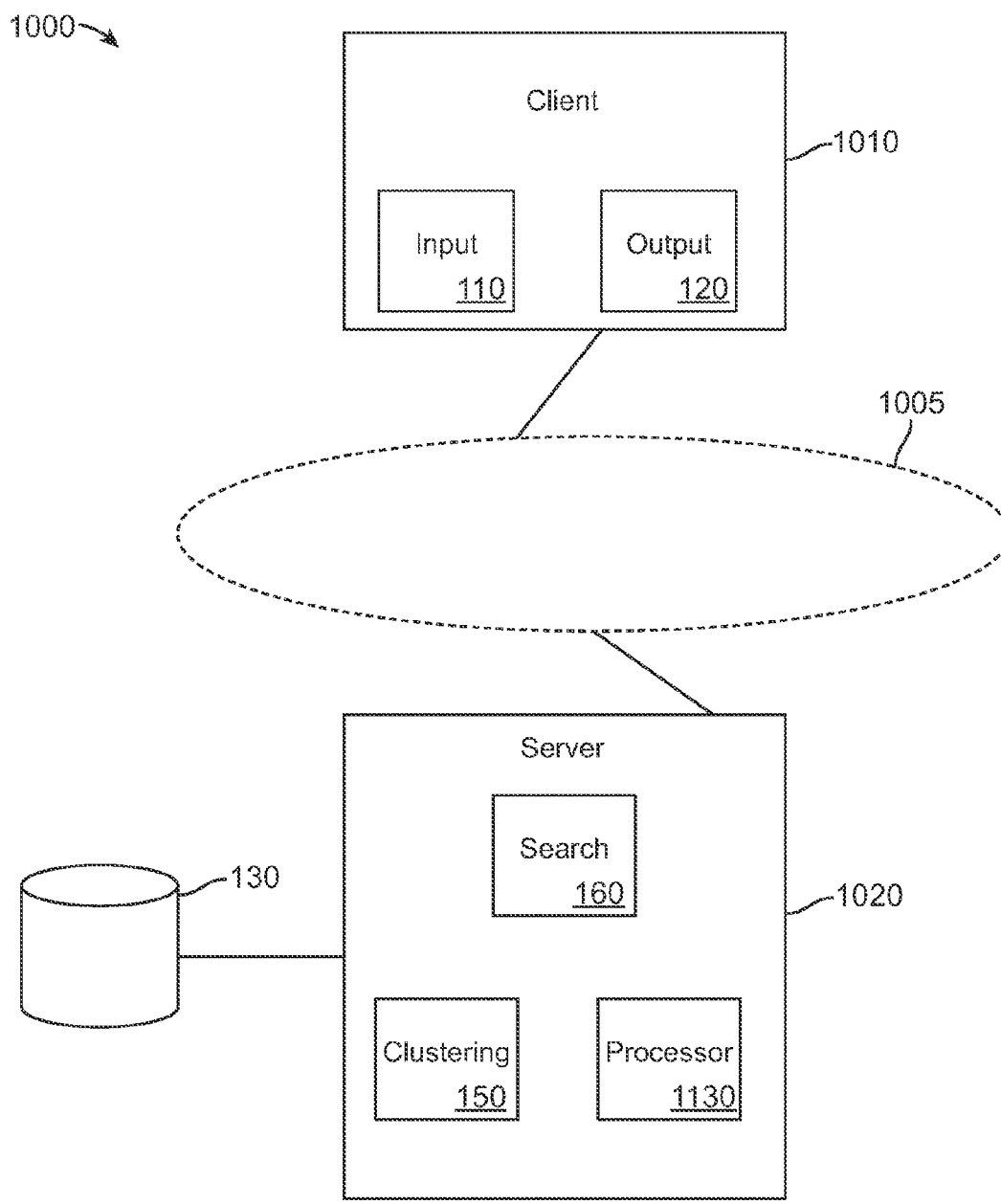
FIG. 10 illustrates a hierarchical search retrieval client-server system according to one embodiment of the invention.

FIG. 10 illustrates an example client-server system 1000, implementing aspects of the invention similarly as with the retrieval system 100. The system 1000 may comprise a client device 1010 including the input module 110 and the output module 120. The system 1000 further includes the server device 1020 including the clustering module 150, the search module 160 and a processor 1130 coupled with the search module 160 and the clustering module 150. This embodiment of the invention differs from the search retrieval system 100 as the clustering module 150 and search module 160 are implemented in the server device 1020, while the input module 110 and the output module 120 are implemented in the client device 1010. In one example, the index repository 130 is coupled to the server device 1020. The client device 1010 communicates with the server device 1020 via a wired or wireless connection 1005. The connection 1005 may be a local area network (LAN), wireless LAN (WLAN), Internet, local network, home network, private network, etc.

In one embodiment of the invention, the clustering module 150 and the search module 160 of system 1000 provides search results using proximity for clustering resulting/returned information similarly with respect to search device 100. In one embodiment of the invention, a browser may be implemented in the client device 1010 in connection with the input module 110 and output module 120 to communicate over the connection 1005 with the server device 1020. In one or more embodiments of the invention, the server device 1020 may employ various tools, functions, etc., available to the server device 1020 based on operating systems, application software, database software, etc. for assisting with basic processing and utilized by the clustering module 150 and the search module 160 of the server device 1020 to assist in the server device 1020 providing search results using proximity for clustering resulting/returned information.

Figure 11:
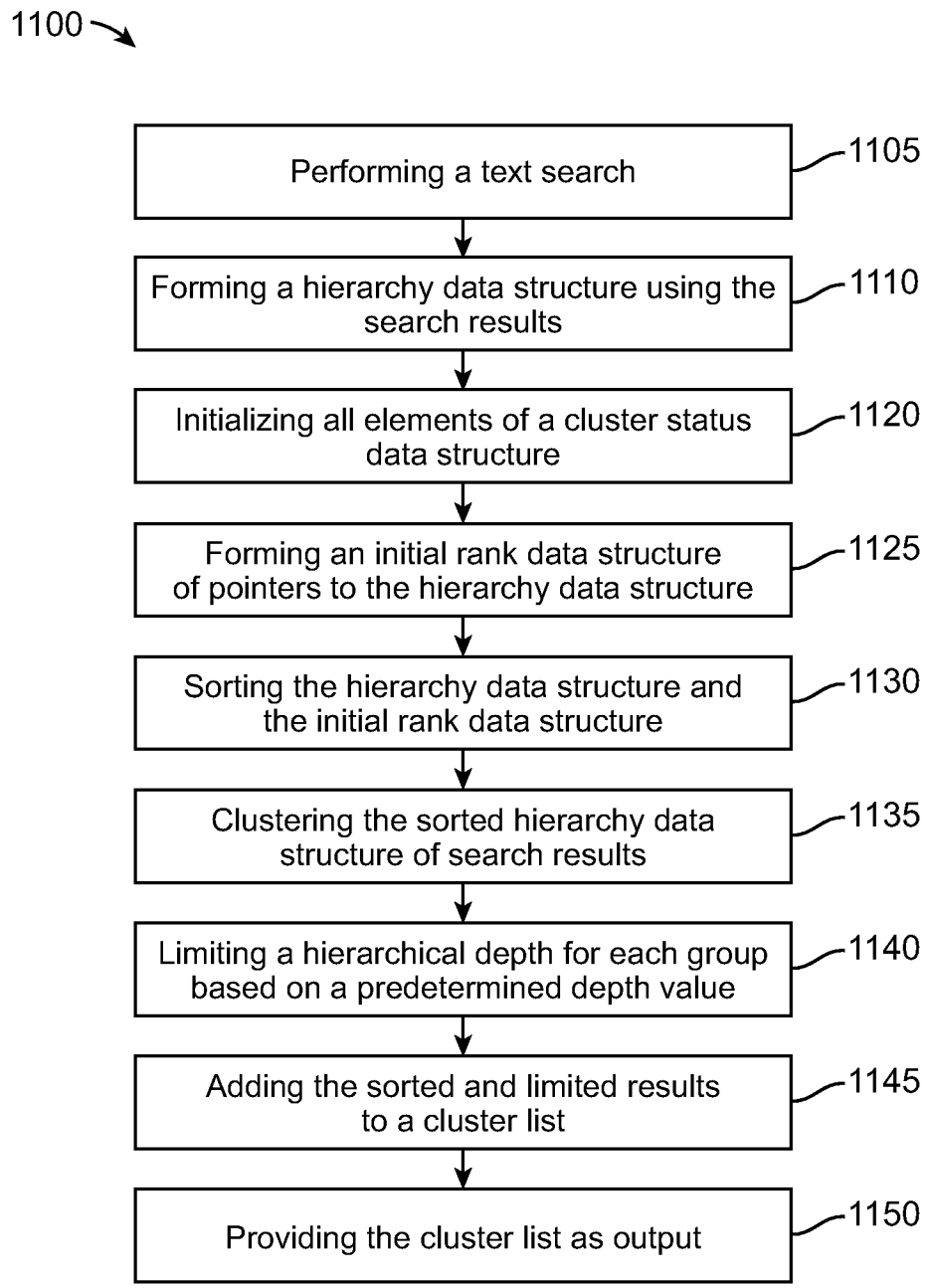
FIG. 11 illustrates a block diagram of a hierarchical search retrieval process according to one embodiment of the invention.

FIG. 11 illustrates a block diagram of an example process 1100 for providing search results using proximity for clustering the returned information, according to an embodiment of the invention. In one or more embodiments of the invention, the details of the process 1100 are similar in functionality with respect to one or more embodiments of the hierarchical search retrieval device 100 and the system 1000, in particular to the functionality of the search module 160 and the clustering module 150 employed in the search retrieval device 100 and the system 1000.

According to the process 1100, block 1105 provides a navigational result as a result of navigating by a user through a hierarchy for a concept, e.g. 'Rhubarb.' Navigation may be performed through many types of interfaces, such as a keyboard, a selection via a pointing device (e.g., a mouse), voice commands converted into text, resistive digitizers (i.e., touch-screens), etc. The navigation performed may traverse through index documents stored in a repository, such as index repository 130.

Block 1110 forms a hierarchy location sortable data structure, such as a one or more dimensional hierarchy array/list, a tree structure, a queue, a database, etc. limited to size m. As noted, in one example, m equals the lesser of a predefined number n (that can be set based on system capability and processing bandwidth to limit clustering to the top n results), and the number of search query results returned. In one embodiment of the invention, block 1110 also assigns a number for each search result in the hierarchy data structure.

In block 1120 all elements of a cluster status data structure "CLUSTERED" of size m are initialized to an initial status identifier as described above. In block 1125, an initial rank data structure "INITIAL_RANK" of pointers to each of the first search results stored in the hierarchy data structure is formed, where each pointer element of the rank data structure has an initial value as described above. In block 1130, the hierarchy data structure and the initial rank data structure are sorted based on the hierarchy location.

Block 1135 performs clustering of the sorted hierarchy data structure of search results by categorizing the search results in the hierarchy data structure into clusters or groups that are related based on hierarchical proximity (i.e., based on location relationship in a hierarchy) or navigational proximity (i.e., based on moving between information in a proximate space in, for example a results list, authored hierarchy, etc. In block 1140, a hierarchical depth is set for each group based on a predetermined depth value limit/threshold selected by a user to reduce hierarchical results for presentation. In block 1145, the sorted search results are added to a presentation cluster list. In block 1150, the cluster list is provided as output e.g., on a display device for a user review.

In one embodiment of the invention, process 1100 may further include ranking the clusters in hierarchical order based on a scoring factor and determining navigational proximity or hierarchical proximity as described above with respect to processing by the clustering module 150 in search retrieval system 100 and system 1000.

In another embodiment of the invention, process 1100 may include assigning values/numbers to the hierarchy level locations, where different hierarchy level locations are separated by placing a step symbol, as described above, between the different hierarchy assigned values to the hierarchy level locations. In this embodiment of the invention, a number of steps between hierarchy level locations in the hierarchy locations data structure HIERARCHY_LOCATIONS is determined based on the number of step symbols between hierarchy level locations, as described above with respect to processing by the clustering module 150 in search retrieval system 100 and system 1000.

In one or more embodiments of the invention, upon determining that search results belong to more than one location in a hierarchy data structure, the search result with more than one assigned location in the HIERARCHY_LOCATIONS data structure is added to a cluster having a least number of determined steps, as described above with respect to processing by the clustering module 150 in search retrieval system 100 and system 1100.

Figure 12:
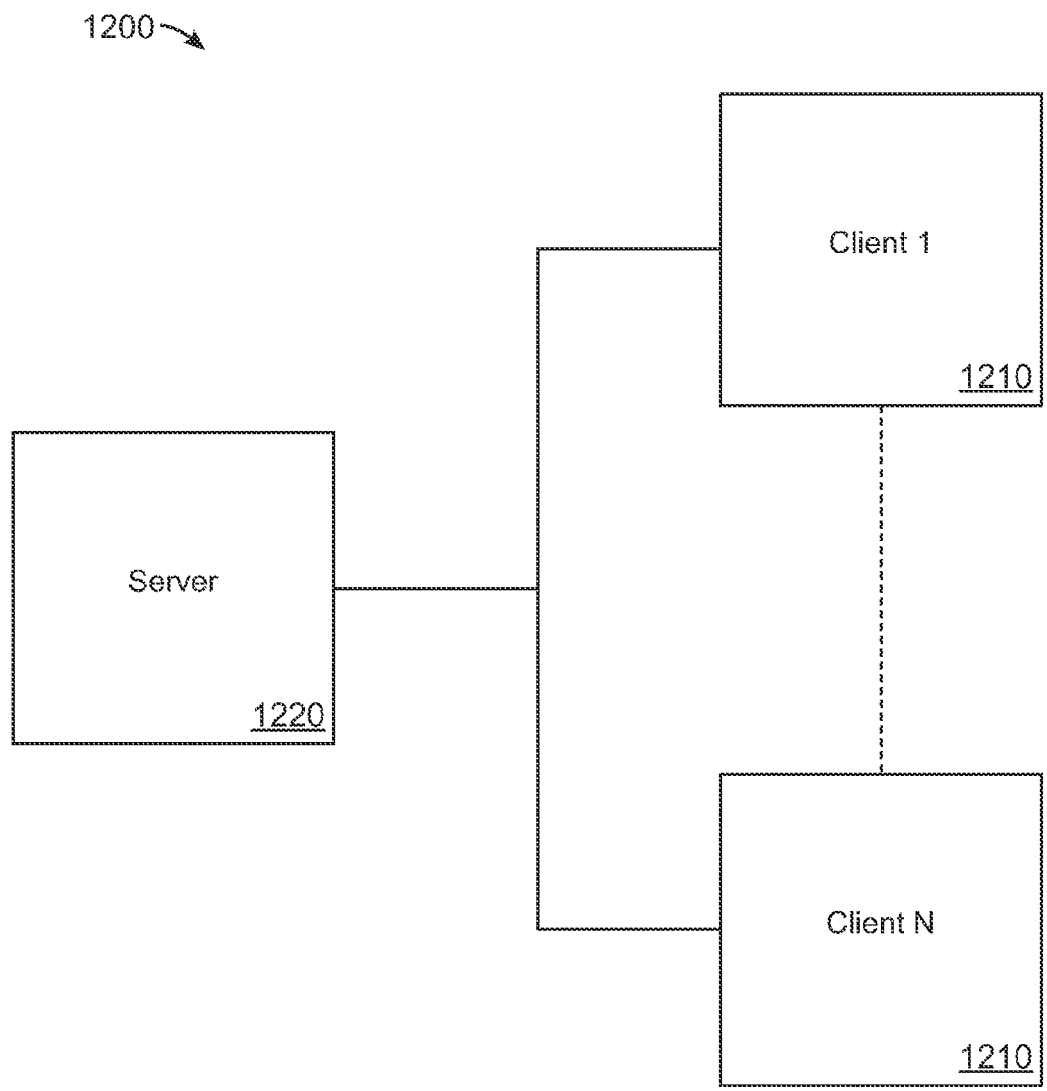
FIG. 12 illustrates a distributed system according to an embodiment of the invention.

FIG. 12 shows a block diagram of example architecture of an embodiment of a distributed search system 1200 using hierarchy proximity for clustering returned information according to an embodiment of the invention. In this embodiment of the invention, the distributed system 1200 includes clients 1 1210 through client N 1210 that may be distributed, in any combination in a network of any of the following: a local area network (LAN), wireless LAN (WLAN), Internet, local network, home network, private network, etc., or any combination of network types, and connect to a server 1220 via a wire or wireless network. In this embodiment of the invention, the server 1220 performs similar functions as with the server 1020 in system 1000. The distributed clients 1-N 1210 perform a similar function as with the client 1010 in system 1100.

In one embodiment of the invention where the distributed search system 1200 uses the Internet, the network represents a worldwide collection of networks and gateways that use the Transmission Control Protocol/Internet Protocol (TCP/IP) suite of protocols to communicate with one another. Included as central to the Internet is a backbone of high-speed data communication lines between major nodes or host computers, comprising a multitude (e.g., thousands, tens of thousands, etc.) of commercial, governmental, educational and other computer systems that route data and messages.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustrated in FIG. 11 and block diagrams in FIGS. 1, 10 and 12 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I/O devices (including but not limited to keyboards, displays, pointing devices, resistive digitizers (i.e., touch screens), etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A search retrieval system comprising:
   a search engine module employing a hardware processor for determining search results from searching documents stored from previous searches based on an inputted search term; and
   a clustering module employing the hardware processor for:
      forming a limited size hierarchy sortable data structure based on the search results from searching the documents stored from the previous searches;
      assigning a number of hierarchy locations for each search result in the hierarchy data structure;
      clustering the search results in the hierarchy data structure by assigning the search results to particular groups that are related based on proximity of each search result to one another, wherein proximity is one of hierarchical proximity and navigational proximity;
      selecting a user selectable hierarchy depth threshold via a user interface for selectively limiting a hierarchical depth of the clustered hierarchy data structure to adjust clustered hierarchical results for presentation according to the selected hierarchical depth threshold; and
      outputting the clustered hierarchical data structure as a list of search results that is adjusted for presentation based on the selected hierarchy depth threshold, wherein the clustering module assigns values to a portion of the hierarchy locations based on relative location of each of the search results to one another, and limits clustering results to a predefined number based on system capability and processing bandwidth.

2. The apparatus of claim 1, wherein different hierarchy levels are separated by placing a symbol between hierarchy assigned values, and the search results are determined from a limited initial search space comprising the documents stored from previous searches.

3. The apparatus of claim 2, wherein the clustering module determines a number of steps between a sequence of hierarchy locations based on a number of symbols between the sequence of hierarchy locations.

4. The apparatus of claim 3, wherein upon search results belonging to more than one hierarchy location in the hierarchy data structure, the search result with more than one hierarchy location is added to a group having a least number of steps.

5. The apparatus of claim 1, wherein the user interface comprises a graphical user interface.

6. A system comprising:
   a server device coupled to a first hardware processor, the server device comprising:

a search engine module that employs the first hardware processor for determining search results from searching documents stored from previous searches based on an inputted search term; and a clustering module that employs the first hardware processor for:

forming a limited size sortable hierarchy data structure based on the search results from searching the documents stored from the previous searches;

assigning a hierarchy location number for each search result in the hierarchy data structure;

clustering the search results in the hierarchy data structure by categorizing the search results in the hierarchy data structure into particular groups that are related based on location proximity of each search result to one another, wherein proximity is one of hierarchical proximity and navigational proximity;

selecting a particular user selectable depth threshold via a user interface for selectively limiting a hierarchical depth for each group to adjust clustered hierarchical results for presentation according to the selected hierarchical depth threshold; and outputting the clustered hierarchical data structure as a list of search results that is adjusted for presentation based on the selected hierarchy depth threshold, wherein the clustering module employs the first hardware processor for:

assigning values to a portion of the hierarchy locations based on relative location of each of the search results to one another, and limits clustering results to a predefined number based on system capability and processing bandwidth.

7. The system of claim 6, further comprising:

a client device coupled with a second hardware processor, the client device comprising:

an input module that employs the second hardware processor for receiving the inputted search term to search portions of the clustered hierarchical data structure; and an output module that employs the second hardware processor for receiving the list of search results from the server device.

8. The system of claim 6, wherein documents in the clustered hierarchical data structure are initially provided by a publisher.

9. The system of claim 8, wherein the documents are each learned based on search queries and feedback.

10. The system of claim 6, wherein different hierarchy levels are separated by placing a symbol between a sequence of related hierarchy assigned values;

and the clustering module employs the first hardware processor for:

determining a number of steps between the sequence of related hierarchy locations based on a number of symbols between the sequence of related hierarchy locations, wherein upon search results belonging to more than one location in a hierarchy data structure, the search result with more than one location is added to a group having a least number of steps.

11. The system of claim 6, wherein a plurality of clients are coupled with the server device, and the user interface comprises a graphical user interface including a cluster selector graphical element.

12. A method comprising:

employing a hardware processor for performing a text search on a sortable hierarchy data structure of information obtained from documents stored from previous searches;

assigning a location number for each search result in the hierarchy data structure;

sorting the hierarchy data structure based on the search results;

clustering the sorted hierarchy data structure of search results by categorizing the search results in the hierarchy data structure into groups that are related based on proximity of each search result to one another, wherein proximity is one of hierarchical proximity and navigational proximity;

selecting a particular user selectable depth threshold via a user interface for selectively limiting a hierarchical depth for each group in the clustered hierarchy data structure based on a predetermined depth value to adjust clustered hierarchical results for presentation according to the selected hierarchical depth threshold; and providing the clustered hierarchical data structure as a list of search results that is adjusted for presentation based on the selected hierarchy depth threshold and output, wherein the hardware processor is further employed for assigning values to a portion of hierarchy locations based on relative location of each of the search results to one another, and limits clustering results to a predefined number based on system capability and processing bandwidth.

13. The method of claim 12, further comprising:

employing the hardware processor for ranking the groups in hierarchical order based on a scoring factor; and determining a number of positions between a ranked group and a sequence of hierarchy locations, wherein the user interface comprises a graphical user interface including a cluster selector graphical element.

14. The method of claim 12, further comprising:

employing the hardware processor for separating different hierarchy levels by adding a symbol between hierarchy assigned numbers; and determining a number of steps between a sequence of hierarchy locations based on a number of symbols between the sequence of hierarchy locations, wherein upon search results belonging to more than one location in a hierarchy, the search result with more than one location in the hierarchy is added to a group having a least number of steps.

15. A computer program product for hierarchical proximity search result clustering comprising:

a computer usable non-transitory medium having computer readable program code embodied therewith, the computer readable program code comprising:

computer readable program code configured to perform an initial text search on a limited search space comprising documents stored from previous searches to obtain search results based on an inputted search term;

assign a location number for each search result in a formed sortable hierarchy data structure of search results;

sort the hierarchy data structure;

cluster the sorted hierarchy data structure of search results by categorizing the search results in the hierarchy data structure into groups that are related based on proximity of each search result to one another, wherein proximity is one of hierarchical proximity and navigational proximity;

selectively limit a hierarchical depth for each group in the clustered hierarchy data structure based on a user selectable depth threshold value from a user interface to adjust clustered hierarchical results for presentation according to a selected hierarchical depth threshold; and provide the clustered hierarchical data structure as a list of search results that is adjusted for presentation based on the selected hierarchy depth threshold and output, wherein the computer readable program code is further configured to assign values to a portion of hierarchy locations based on relative location of each of the search results to one another, and limit clustering results to a predefined number based on system capability and processing bandwidth.

16. The computer program product of claim 15, wherein the computer is further caused to:

rank the groups in hierarchical order based on a scoring factor; and determine a number of positions between a ranked group and a sequence of hierarchy locations.

17. The computer program product of claim 16, wherein the computer is further caused to:

insert a symbol between hierarchy assigned location numbers to separated different hierarchy levels; and determine a number of steps between a sequence of hierarchy locations based on a number of symbols between hierarchy locations.

18. The computer program product of claim 17, wherein upon the search results belonging to more than one hierarchy location in the hierarchy data structure, the search result with more than one hierarchy location is added to a group having a least number of steps, wherein the hierarchy data structure comprises information that is classified by one of subject matter and topic.

19. The computer program product of claim 16, wherein the user interface comprises a graphical user interface including a cluster selector graphical element.

* * * * *